United States Patent
James

(10) Patent No.: US 6,321,304 B1
(45) Date of Patent: Nov. 20, 2001

(54) SYSTEM AND METHOD FOR DELETING READ-ONLY HEAD ENTRIES IN MULTI-PROCESSOR COMPUTER SYSTEMS SUPPORTING CACHE COHERENCE WITH MIXED PROTOCOLS

(75) Inventor: David V. James, Palo Alto, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/235,588

(22) Filed: Jan. 22, 1999

(51) Int. Cl.[7] .................................................. G06F 13/00
(52) U.S. Cl. ...................... 711/141; 711/102; 711/103; 711/145
(58) Field of Search ..................... 711/102, 103, 711/124, 141, 145, 147, 152; 709/322; 710/200

(56) References Cited

U.S. PATENT DOCUMENTS

| | | | | |
|---|---|---|---|---|
| 4,747,043 | * | 5/1988 | Rodman ............................. | 711/124 |
| 5,060,144 | * | 10/1991 | Sipple et al. ....................... | 710/200 |
| 5,537,636 | * | 7/1996 | Uchida et al. ..................... | 707/200 |
| 5,802,578 | * | 9/1998 | Lovett ................................ | 711/147 |
| 5,802,582 | * | 9/1998 | Ekanadlham et al. ............. | 711/152 |
| 5,832,263 | * | 11/1998 | Hansen et al. .................... | 709/322 |
| 6,014,667 | * | 1/2000 | Jenkins et al. .................... | 707/10 |
| 6,035,376 | * | 3/2000 | James ................................ | 711/145 |
| 6,052,761 | * | 4/2000 | Hornung et al. .................. | 711/141 |

* cited by examiner

*Primary Examiner*—Matthew Kim
*Assistant Examiner*—Fred F. Tzeng
(74) *Attorney, Agent, or Firm*—Simon & Koerner LLP; Nancy R. Simon

(57) ABSTRACT

In a mixed-protocol multiple-processor cache coherence computer system one processor may support read-only and read-write lists while another processor may support only read-write lists. Data copied to a cache is called a cache line while a copy of the same data remaining in memory is called a memory line. A memory line is stale when its associated cache line has been modified. The main memory of the system always points to the processor at the head of each list and includes indications of fresh and stale memory line states. The present invention deletes the head entry of a read-only cache-sharing list where the head entry supports read-only operations and the next-list entry supports only read-write operations. The head of the list informs the next-list entry that the next-list entry is about to become the head of the list. The main memory then repositions its head-pointer to the next-list entry and changes the memory state from fresh to stale. The head of the list then informs the next-list entry that the deletion is complete and the old head is thus deleted from the list.

3 Claims, 21 Drawing Sheets

| OLD STATE | REQUEST GENERATED | RETURNED RESPONSE | NEW STATE |
|---|---|---|---|
| (1) HEADf | cMarkNextFresh | MORE | HEADf_PUSH |
| (2) HEADf_PUSH | mMarkForwardFresh | DONE | HEAD_POKE |
| (3) HEAD_POKE | cMarkHeadPoke | DONE | INVALID |

CACHE REQUESTER 802D
(DELETION SEQUENCE)

| OLD STATE | REQUEST GENERATED | RETURNED RESPONSE | NEW STATE |
|---|---|---|---|
| (1) HEADf | cMarkNextFresh | DONE | HEADd_PUSH |
| (2) HEADd_PUSH | mMarkForwardOwned | DONE | HEAD_POKE |
| (3) HEAD_POKE | cMarkHeadPoke | DONE | INVALID |

CACHE REQUESTER 802D
(DELETION SEQUENCE)

| OLD STATE | REQUEST GENERATED | RETURNED RESPONSE | NEW STATE |
|---|---|---|---|
| (1) HEADd | cMarkNextOwned | DONE | HEADd_PUSH |
| (2) HEADd_PUSH | mMarkForwardOwned | DONE | HEAD_POKE |
| (3) HEAD_POKE | cMarkHeadPoke | DONE | INVALID |

CACHE REQUESTER 802D
(DELETION SEQUENCE)

FIG. 9C

| OLD STATE | RECEIVED REQUEST | NEW STATE | RETURNED RESPONSE |
|---|---|---|---|
| (1) COREd | cMarkNextFresh | HEADf_WAIT | MORE |
| (2) HEADf_WAIT | cMarkHeadPoke | HEADf | DONE |
| (3) COREd | cMarkNextOwned | HEADd_WAIT | DONE |
| (4) HEADd_WAIT | cMarkHeadPoke | HEADd | DONE |

CACHE RESPONDER 804C
(DELETION SEQUENCE)

| OLD STATE | RECEIVED REQUEST | NEW STATE | RETURNED RESPONSE |
|---|---|---|---|
| (1) COREd | cMarkNextFresh | HEADd_WAIT | DONE |
| (2) COREd | cMarkNextOwned | HEADd_WAIT | DONE |
| (3) HEADd_WAIT | cMarkHeadPoke | HEADd | DONE |

CACHE RESPONDER 804C
(DELETION SEQUENCE)

FIG. 9E

| OLD ID | OLD STATE | REQUEST | NEW ID | RETURNED RESPONSE | NEW STATE |
|---|---|---|---|---|---|
| 108D | FRESH | mMarkForwardFresh | 108C | DONE | FRESH |
| 108D | FRESH | mMarkForwardOwned | 108C | DONE | STALE |

MEMORY RESPONDER (DELETION SEQUENCE)

FIG. 9F

SYSTEM AND METHOD FOR DELETING READ-ONLY HEAD ENTRIES IN MULTI-PROCESSOR COMPUTER SYSTEMS SUPPORTING CACHE COHERENCE WITH MIXED PROTOCOLS

BACKGROUND OF THE INVENTION

1. Field of the Invention

This invention relates generally to cache coherence in computer systems having multiple processors with caches, and more particularly to a system and method for deleting a read-only head entry in systems supporting mixed-coherence protocol options.

2. Description of the Background Art

Multiple-processor computer systems involve various processors which at the same time may each work on a separate portion of a problem or work on a different problem. FIG. 1 shows a multi-processor system, including a plurality of Central Processing Units (CPUs) or processors 102A, 102B ... 102N, communicating with memory 104 via interconnect 106, which could be, for example, a bus or a collection of point-to-point links. Processors 102 access data from memory 104 for a read or a write. In a read operation, processor 102 receives data from memory 104 without modifying the data, while in a write operation processor 102 modifies the data transmitted to memory 104.

Each processor 102 generally has a respective cache unit 108A, 108B, ... 108N, which is a relatively small group of high speed memory cells dedicated to that processor. A processor 102's cache 108 is usually on the processor chip itself or may be on separate chips, but is local to processor 102. Cache 108 for each processor 102 is used to hold data that was accessed recently by that processor. Since a processor 102 does not have to go through the interconnecting bus 106 and wait for the bus 106 traffic, the processor 102 can generally access data in its cache 108 faster than it can access data in the main memory 104. In a normal operation, a processor 102N first reads data from memory 104 and copies that data to the processor's own cache 108N. During subsequent accesses for the same data the processor 102N fetches the data from its own cache 108N. In effect, after the first read, data in cache 108N is the same copy of data in memory 104 except that the data is now in a high-speed local storage. Typically, cache 108N can be accessed in one or two cycles of CPU time while it takes a processor 102 15 to 50 cycles to access memory 104. A typical processor 102 runs at about 333 Mhz or 3 ns (nanoseconds) per cycle, but it takes at least 60 ns or 20 cycles to access memory 104.

A measure of data, typically 32, 64, 128, or $2^n$ bytes, brought from memory 104 to cache 108 is usually called a "cache line." The data of which a copy was brought to cache 108 and which remains in memory 104 is called a "memory line." The size of a cache line or a memory line is determined by a balance of the overhead per read/write operation versus the usual amount of data transferred from memory and cache. An efficient size for a cache line results in transfers spending about 25% of their time on overhead and 75% of their time on actual data transfer.

A particular problem with using caches is that data becomes "stale." A first processor 102A may access data in the main memory 104 and copy the data into its cache 108A. If the first processor 102A then modifies the cache line of data in its cache 108A, then at that instant the corresponding memory line becomes stale. If a second processor, 102B for example, subsequently accesses the original data in the main memory 104, the second processor 102B will not find the most current version of the data because the most current version is in the cache 108A. For each cache-line address, cache coherence guarantees that only one copy of data in cache 108 can be modified. Identical copies of a cache line may be present in multiple caches 108, and thus be read by multiple processors 102 at the same time, but only one processor 102 is allowed to write, i.e., modify, the data. After a processor 102 writes to its cache 108 that processor 102 must "invalidate" any copies of that data in other caches to notify other processors 102 that their cache lines are no longer current.

FIG. 2A shows valid cache lines D0 for caches 108A to 108N whereas FIG. 2B shows cache 108B with an updated cache line D1 and other caches 108A, 108C, and 108N with invalidated cache lines D0. The processors 102A, 102C, and 102N with invalidated cache data D0 in their respective caches 108 must fetch the updated version of cache line D1 if they want to access that data line again.

Nonnally and for illustrative purposes in the following discussion, cache coherence protocols are executed by processors 102 associated with their related caches. However, in other embodiments these protocols may be executed by one or more specialized and dedicated cache controllers.

There are different cache coherence management methods for permitting a processor 102 to modify its cache line in cache 108 and invalidate other cache lines. One method (related to the present invention) utilizes, for each cache line, a respective "shared list" representing cache-line correspondences by "double-links" where each cache has a forward pointer pointing to the next cache entry in the list and a backward pointer pointing to the previous cache entry in the list. Memory 104 has a pointer which always points to the head of the list.

FIG. 3 shows a linked list 300 of caches 108A ... 108N with the associated memory 104. Memory 104 has a pointer which always points to the head (cache 108A) of the list while the forward pointers Af, Bf, and Cf of caches 108A, 108B, and 108C respectively point forward to the succeeding caches 108B, 108C, and 108D (not shown). Similarly, backward pointers Nb, Cb, and Bb of caches 108N, 108C, and 108B respectively point backward to the preceding caches. Because each cache unit 108 is associated with a respective processor 102, a linked list representation of cache 108 is also understood as a linked list representation of processors 102.

There are typically two types of cache sharing lists. The first type of list is the read-only (sometimes called "fresh") list of caches for which none of the processors 102 has permission to modify the data. The second type of list is a read-write (sometimes called "owned") list of caches for which the head-of-list processor 102 may have permission to write to its cache 108. A list is considered "stable" after an entry has been completely entered into or completely deleted from the list. Each of the stable list states is defined by the state of the memory and the states of the entries in the shared list. Relevant states of memory include HOME, FRESH, and STALE. HOME indicates no shared list exists, FRESH indicates a read-only shared list, and STALE indicates the shared list is a read-write list and data in the list can be modified. A processor 102 must get authorization to write to or read from memory. A list entry always enters the list as the list head, and the action of entering is referred to as "prepending" to the list. If a list is FRESH (the data is the same as in memory), the entry that becomes the newly created head receives data from memory; otherwise it receives data from the previous list head. In a read-write list, only the head is allowed to modify (or write to) its own cache line and, after the head has written the data, the head must invalidate the other stale copies of the shared list. In one embodiment, invalidation is done by purging the pending invalidated entries of the shared list.

FIGS. 4A–4F illustrate how the two types of lists are created and grown. Each of the FIGS. 4 includes a before and an after list with states of the list and memory 104. In FIG. 4A, initially memory 104 is in the HOME state, indicating there is no cache shared list. Processor 102A requests permission to read a cache line. Since this is a read request, memory 104 changes from the HOME state to the FRESH state, and the resulting after list 402AR is a read-only list with one entry 108A. Cache 108A receives data from memory 104 because cache 108A accesses data that was previously uncached. This starts the read-only list 402AR.

In FIG. 4B processor 102B requests a read permission to enter the read-only list 402B, which is the same list as 402AR of FIG. 4A. Cache 108B then becomes the head of the list 402BR receiving data line from head 108A. The list 402BR is still a read-only list since both entries of the list have asked for read-only permission, and therefore the memory state remains FRESH.

In FIG. 4C, memory 104 is initially in the HOME state and processor 102A requests a read-write permission. Cache 108A then becomes the head of the list 402CR. Because a read-write permission was requested, list 402CR is a read-write list. As soon as memory 104 grants a read-write permission, memory 104 changes from the HOME state to the STALE state.

In FIG. 4D processor 102B requests a read permission to enter a read-write list 402D. Cache 108B becomes the head of the list 402DR. Since memory 104 is initially in the STALE state, the resulting list 402DR is a read-write list and memory 104 remains in the STALE state.

In FIG. 4E, the initial list 402E is read-only with memory 104 in the FRESH state, and processor 102B requests a write permission. Cache 108B then becomes the head of the list 402ER. Since processor 102B asked for a write permission, memory 104 changes state from FRESH to STALE, and list 402ER is a read-write list.

In FIG. 4F the list 402F is a read-write list and processor 102B requests a write permission. Since list 402F is read-write, list 402FR is also read-write, and memory 104 remains in the STALE state.

Cache list entries may be deleted. However, deleting a head-of-list presents a problem in mixed-coherence protocols, which exist where processor 102 associated with the head of the list supports a read-only option while processor 102 associated with the next-list entry supports only a read-write option. Currently most multi-processor systems support read-write lists and read-only lists are optional.

FIG. 5 illustrates how a cache head 108D would be deleted if processor 102C supports a read-only list. Initially, the list 502A is read-only and memory 104 is FRESH. After cache 108D has been deleted, cache 108C becomes the head of the list 502R, possessing all read-only characteristics of cache 108D and memory 104. List 502R would be read-only with memory 104 in the FRESH state. However, if processor 102C does not support a read-only list, cache 108C cannot inherit the read-only property from memory 104 and cache 108D, resulting in a conflicting situation.

Prior art attempts to resolve this conflict are illustrated in the flowchart of in FIG. 6. In step 600, the head of the list informs the next-list entry that the next-list entry is about to become a read-only-list head. In step 604 the next-list entry responds that it cannot become a read-only-list head because its system does not support the read-only-list option. In step 608 the head of the list then invalidates all copies in the list and in step 612 returns them to memory. However, this solution is inefficient because even processor 102 of the head list wants to withdraw its cache 108 from the list, but other processors may still want to access the same cache copies. In such a situation the other processors must re-start a new sharing cache list by getting the desired cache line from memory 104.

The IEEE Standard of Scalable Coherent Interfaces, IEEE Std. 1596–1992, *Institute of Electrical and Electronics Engineers*, Aug. 2, 1993, defines mechanism for deleting a read-only entry. This mechanism first detects a conflict, converts the list from the read-only to the read-write state and then allows deletion of the head of the list. However, the deleting protocols rely on detection of conflicts and are complex because the conversion between read-only and read-write states is a special operation and, due to other conflicts, is not always successful.

SUMMARY OF THE INVENTION

The present invention provides a system and a method for deleting a head entry of a read-only list in a multi-processor computer system supporting mixed cache coherent protocols involving both read-only and read-write processors. The head of the list supports a read-only protocol while the next-list entry supports only a read-write protocol. The head of the list first informs the next-list entry that the next-list entry is about to become the head of a read-only list. The next-list entry then responds with a status code indicating whether the next-list entry supports read-only. The system then performs operations for the next-list entry to become a new head entry, including updating the forward pointer of memory pointing to the next-list entry as a new head-of-list. If the next-list entry does not support the read-only protocol, the system changes the memory line status from fresh to stale, thereby indicating a new read-write list. However, if the next list entry does support the read-only protocol, the memory line remains fresh, thereby maintaining a read-only list. Finally, the previous head-of-list informs the next-list entry that the previous head of list has been completely deleted from the list. The invention also permits a simpler conversion from read-only to read-write only where data is being written.

BRIEF DESCRIPTION OF THE DRAWINGS

FIGS. 9A 9B, and 9C show details of a cache requester having performed a delete sequence;

FIG. 9E shows details of a cache responder when its processor does not support read-only option; and FIG. 9F shows state table of a memory.

DETAIL DESCRIPTION OF THE PREFERRED EMBODIMENT

This invention provides a system and a method for deleting the head of a cache-sharing list in multiprocessor systems using mixed coherence-protocol options, which exist where one processor supports read-only and read-write lists while one or more other processors do not support read-only lists, but do support read-write lists.

Figure 1:
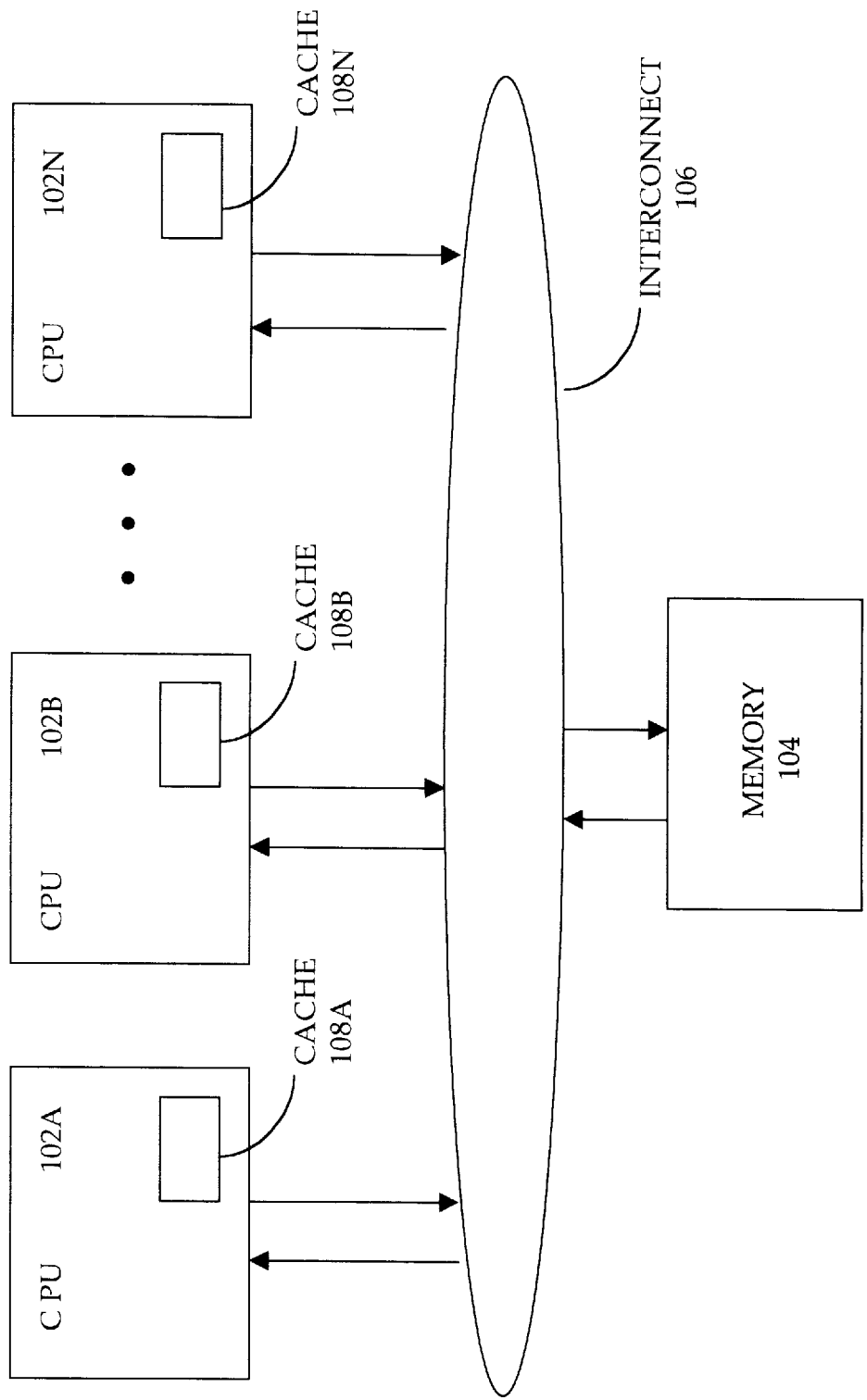
FIG. 1 shows a multi-processor system with a cache memory for each processor.
Figure 2A:
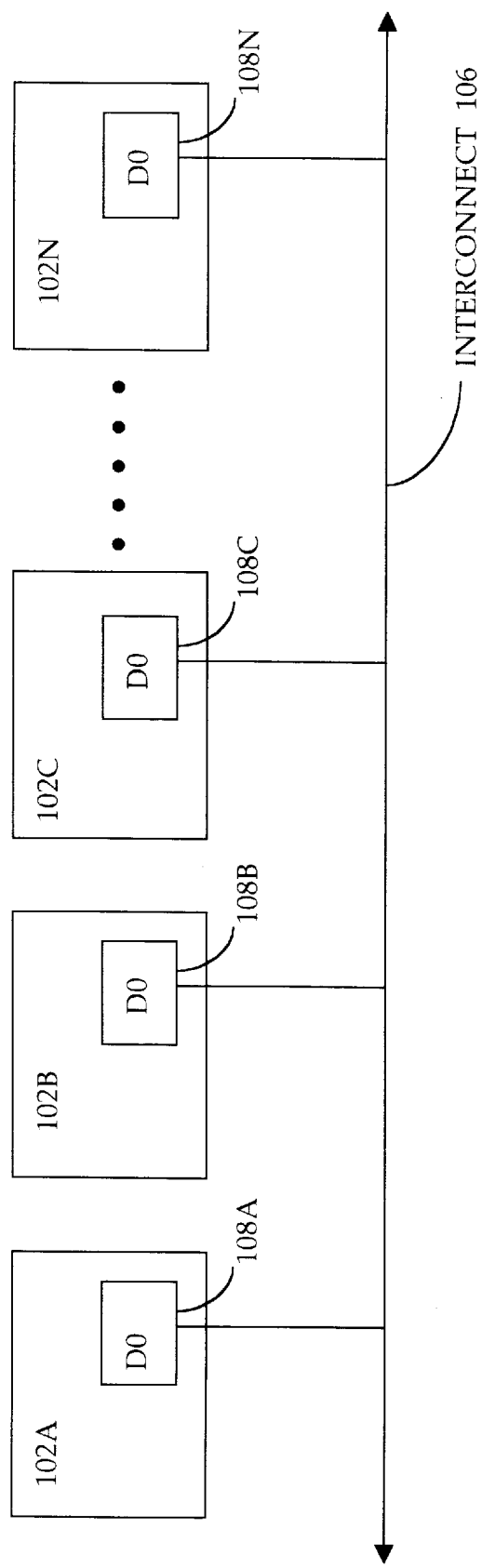
FIG. 2A illustrates all processors' cache lines being valid.
Figure 2B:
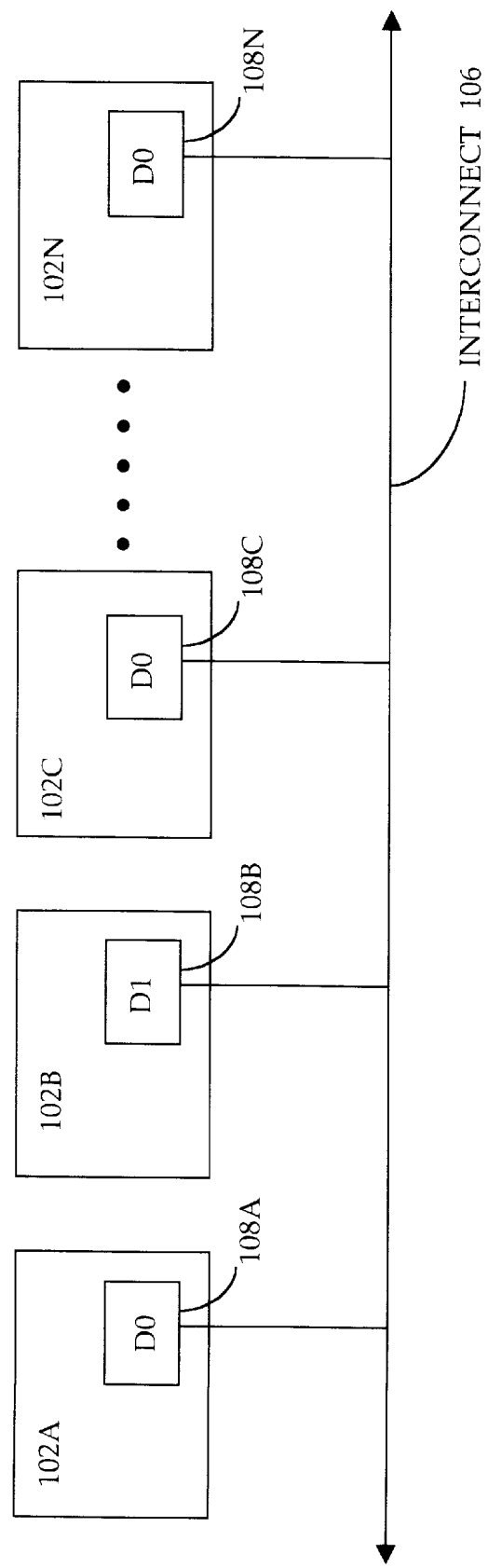
FIG. 2B shows one cache line being valid while others are invalid.
Figure 3:
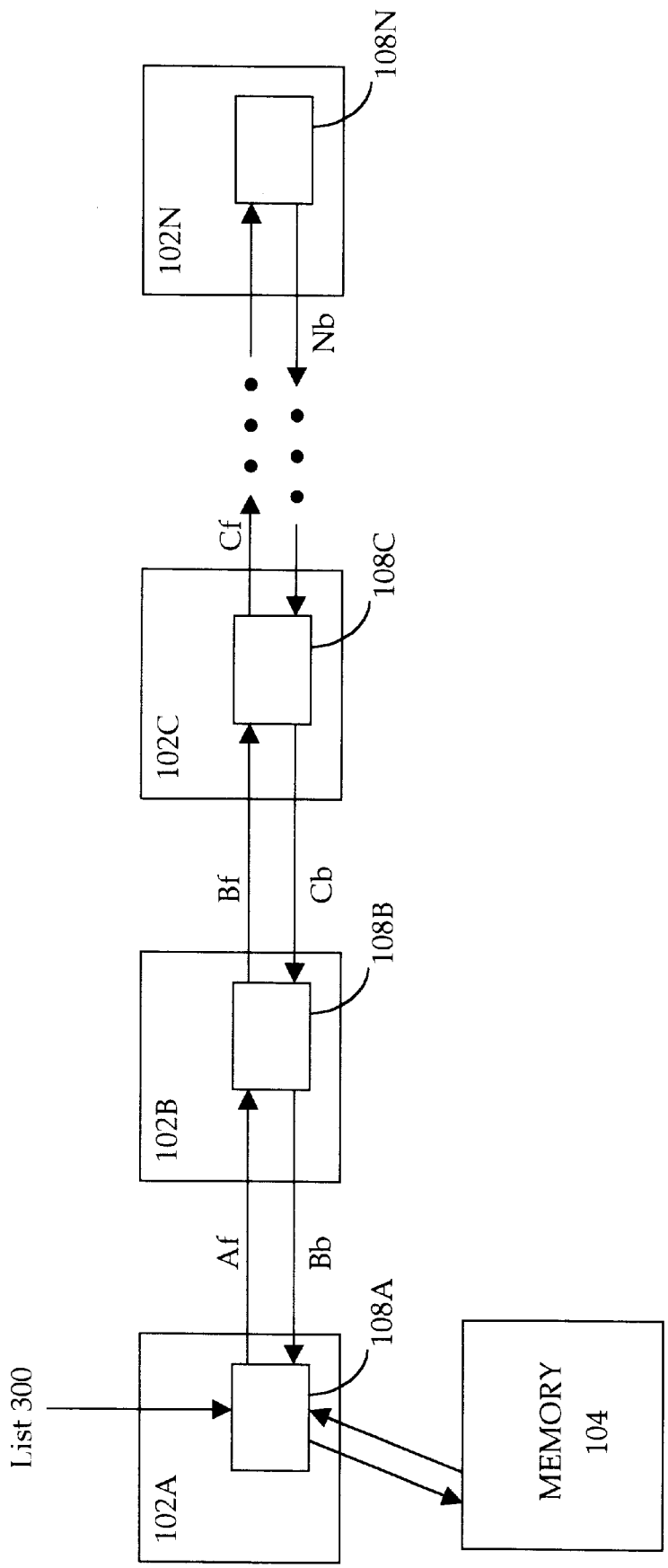
FIG. 3 shows a cache-sharing double-linked list.
Figure 4A:
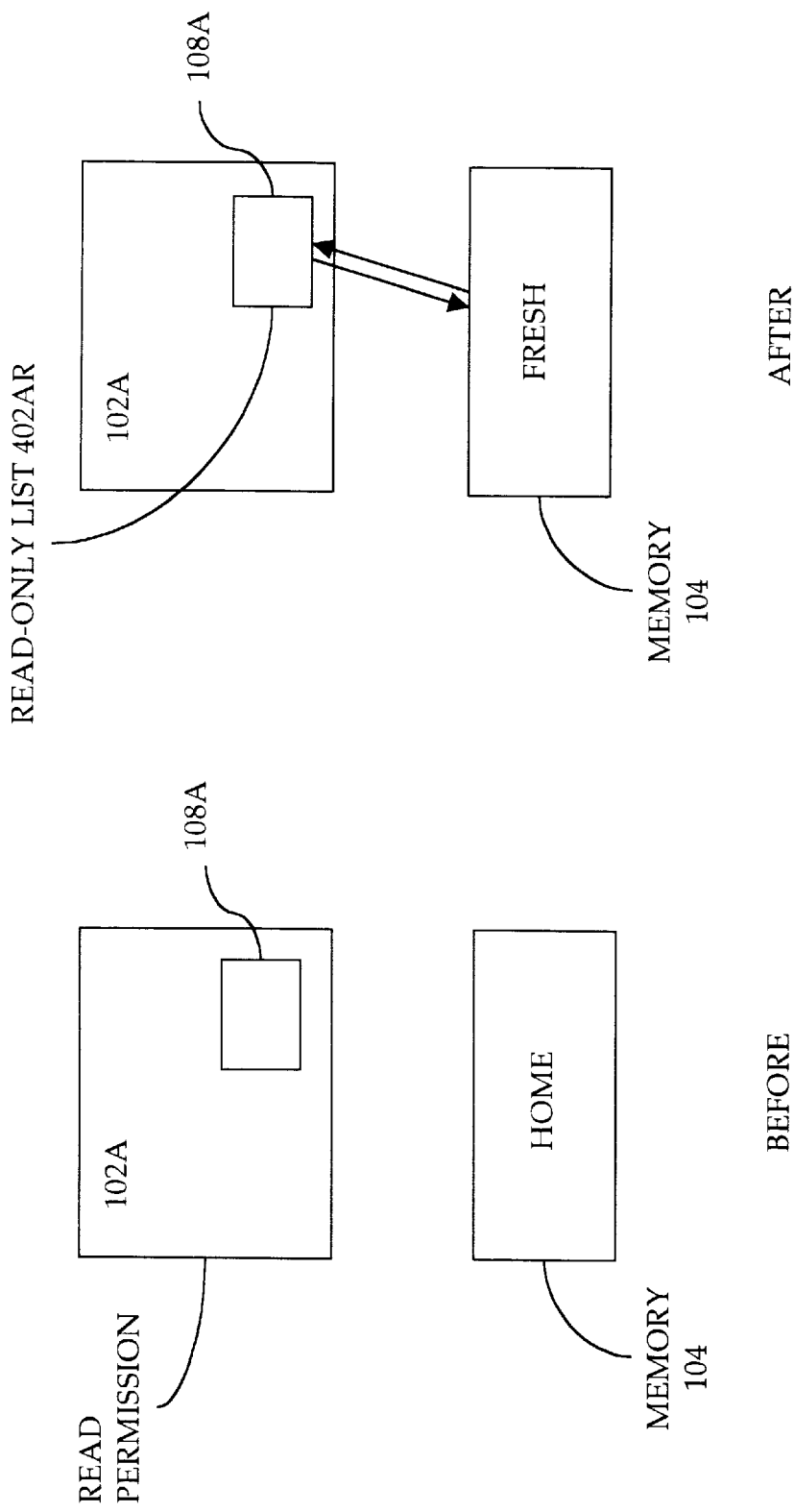
FIG. 4A illustrates a creation of a read-only shared list.
Figure 4B:
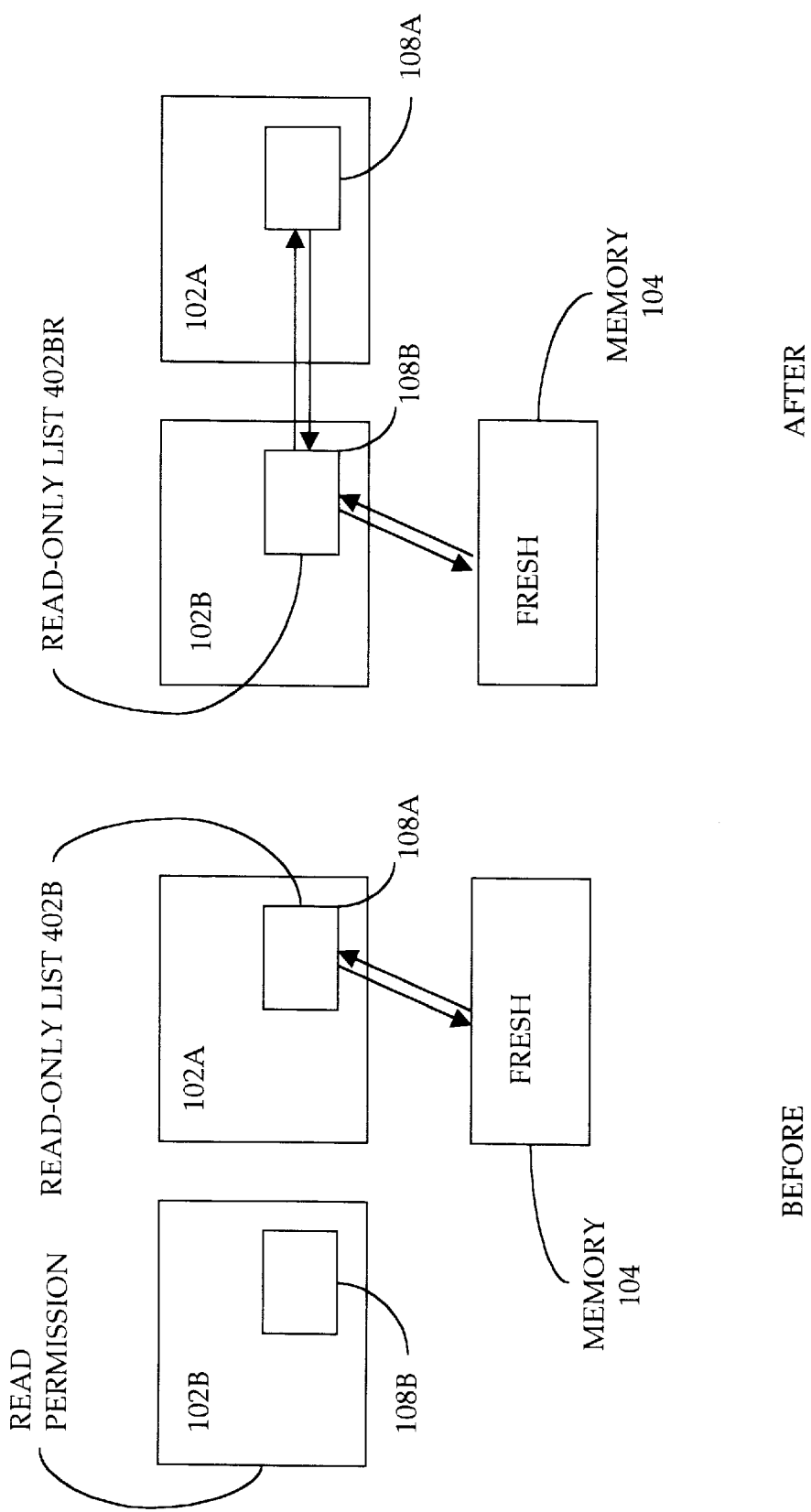
FIG. 4B illustrates a cache entry entering a read-only shared list.
Figure 4C:
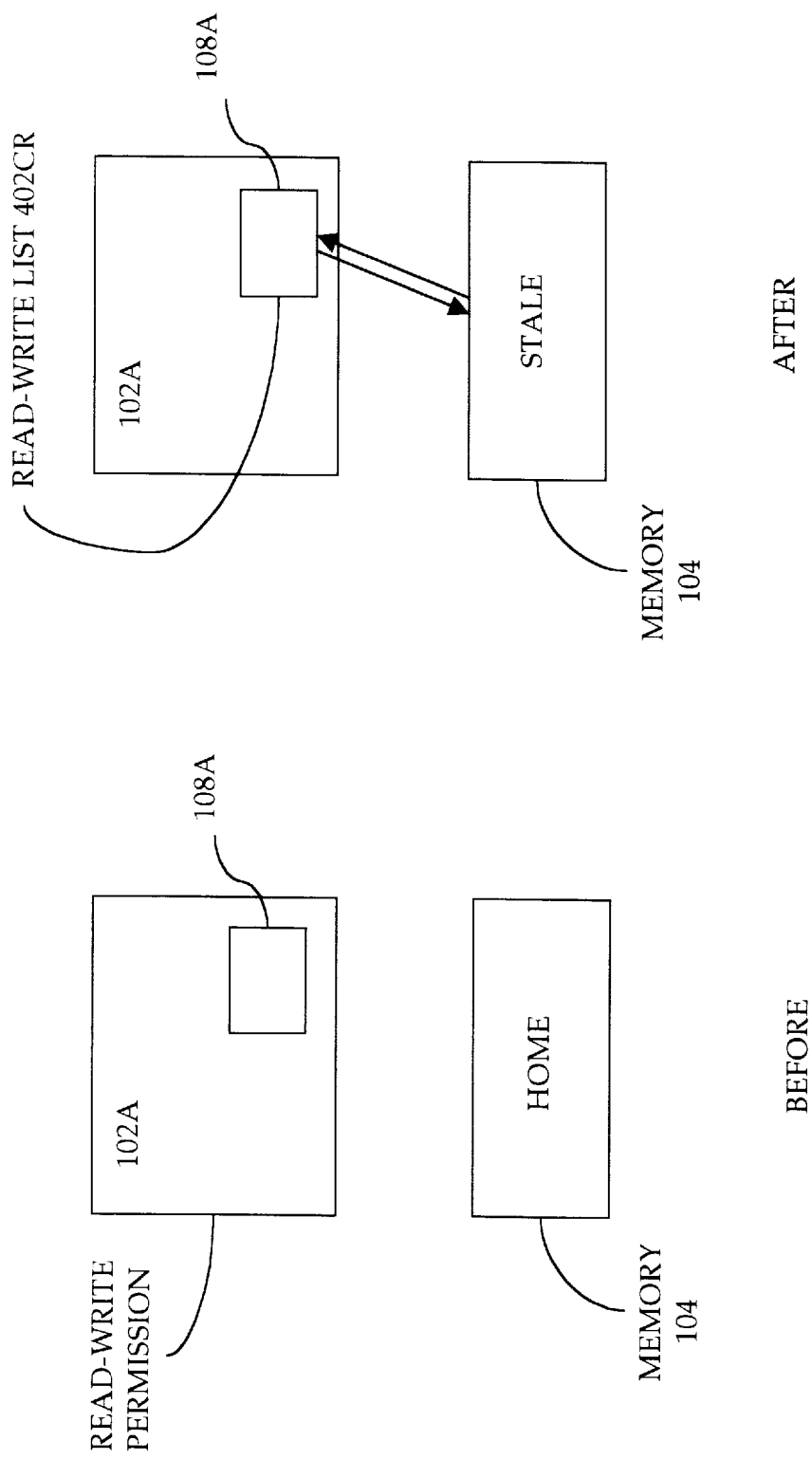
FIG. 4C illustrates creation of a read-write shared list.
Figure 4D:
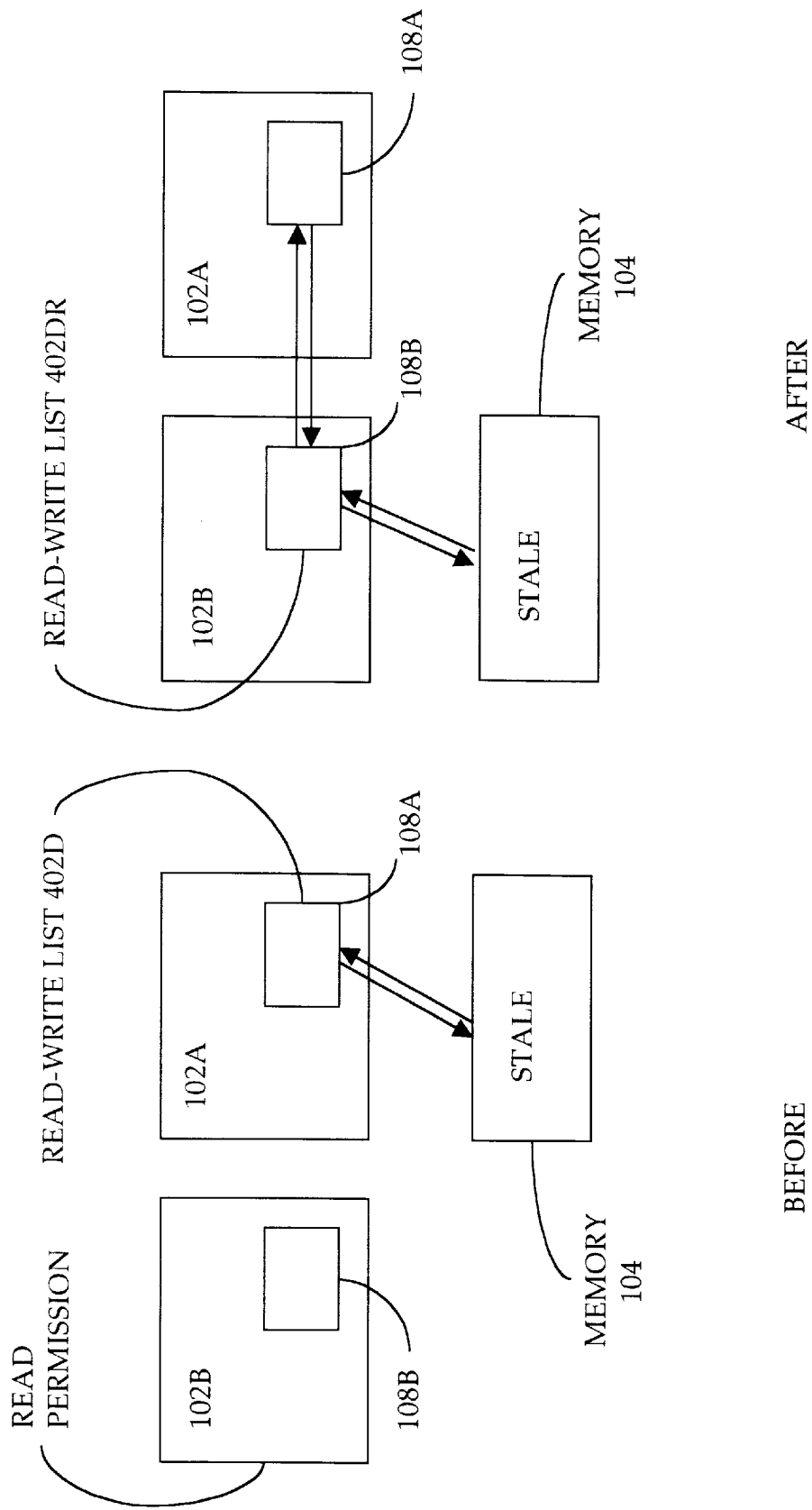
FIG. 4D shows a read-permission entry entering a read-write list.
Figure 4E:
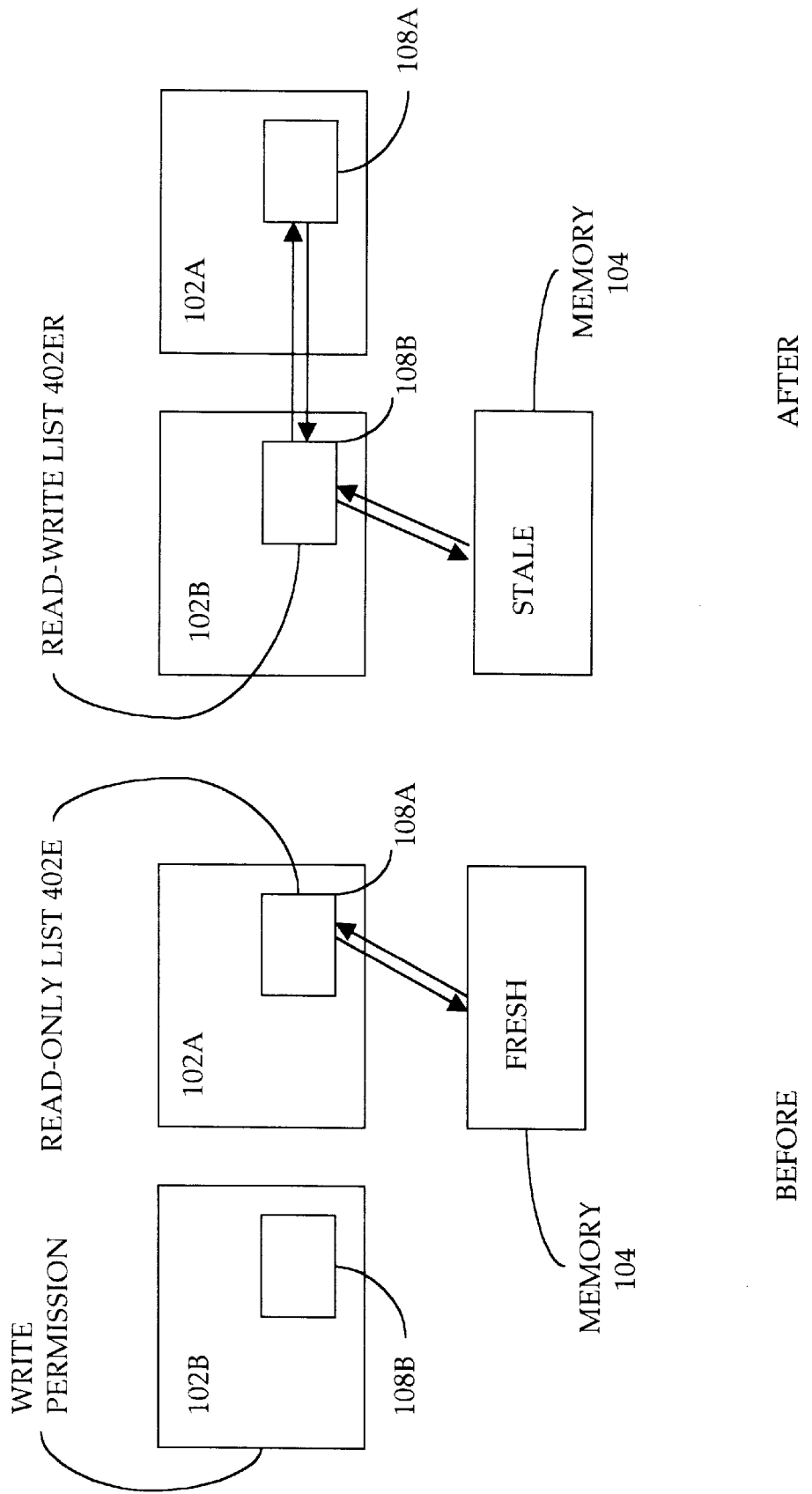
FIG. 4E shows a write-permission entry entering a read-only list.
Figure 4F:
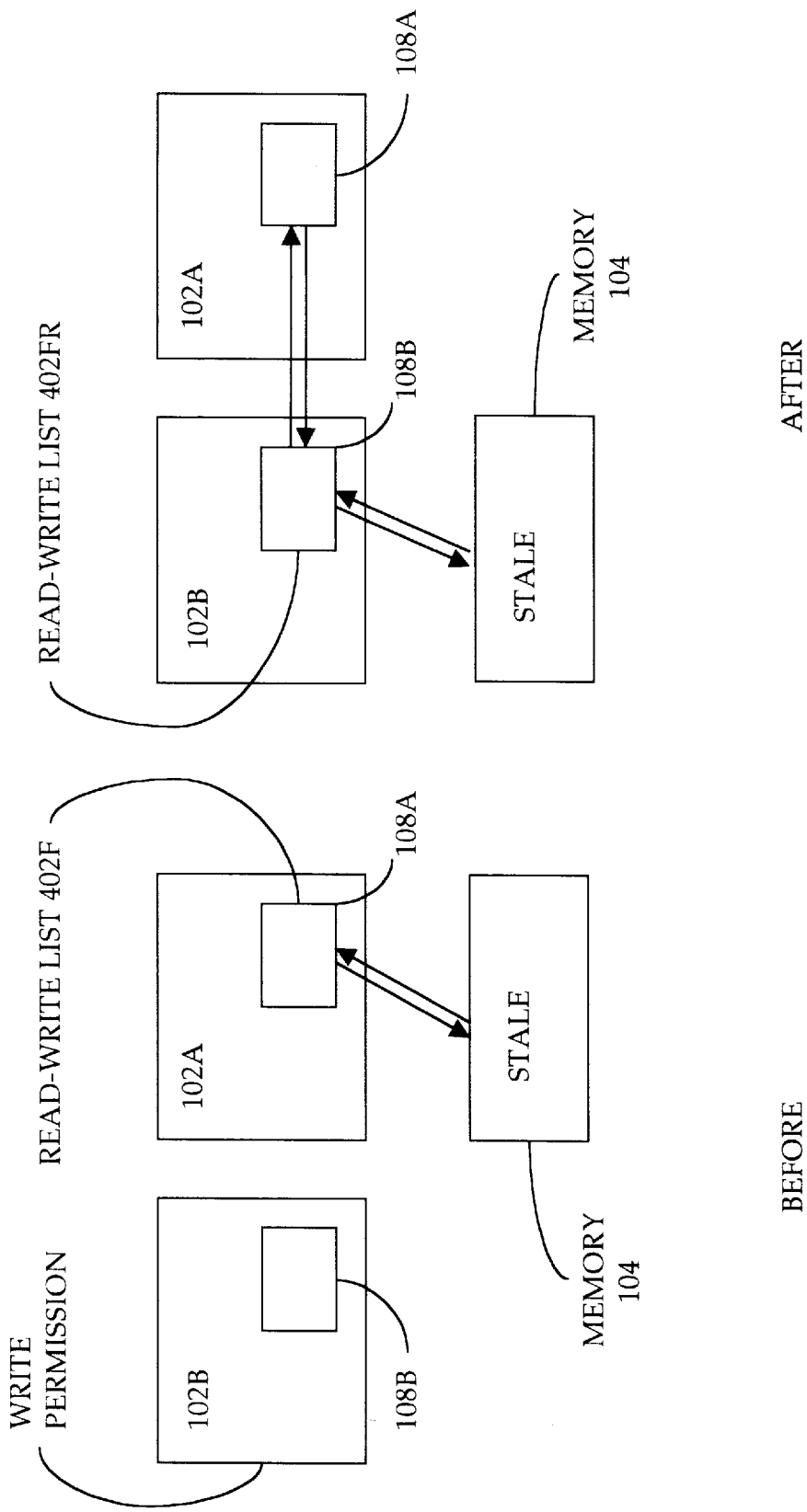
FIG. 4F shows a write-permission entry entering a read-write list.
Figure 5:
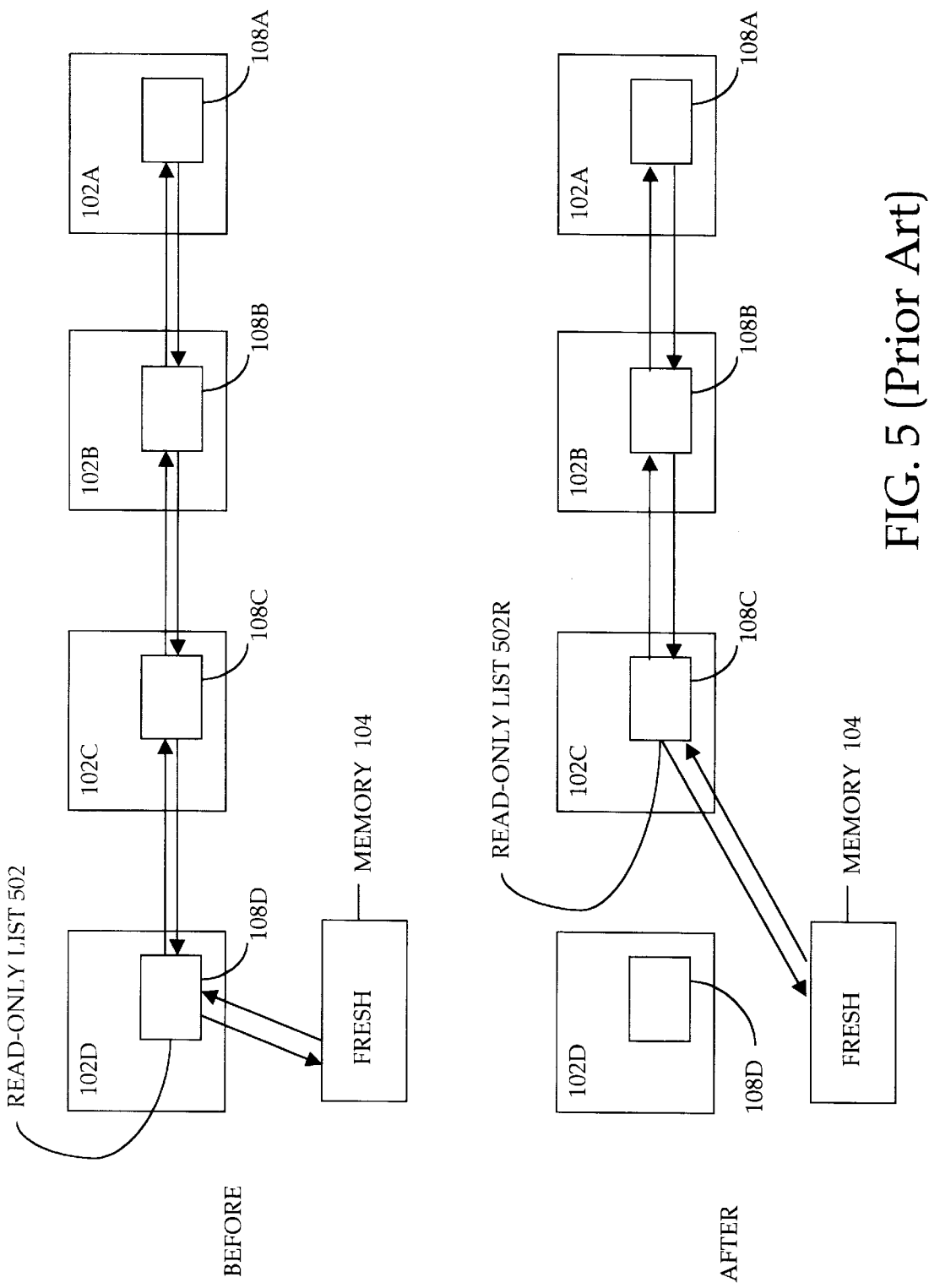
FIG. 5 shows a head entry being deleted in supporting systems.
Figure 6:
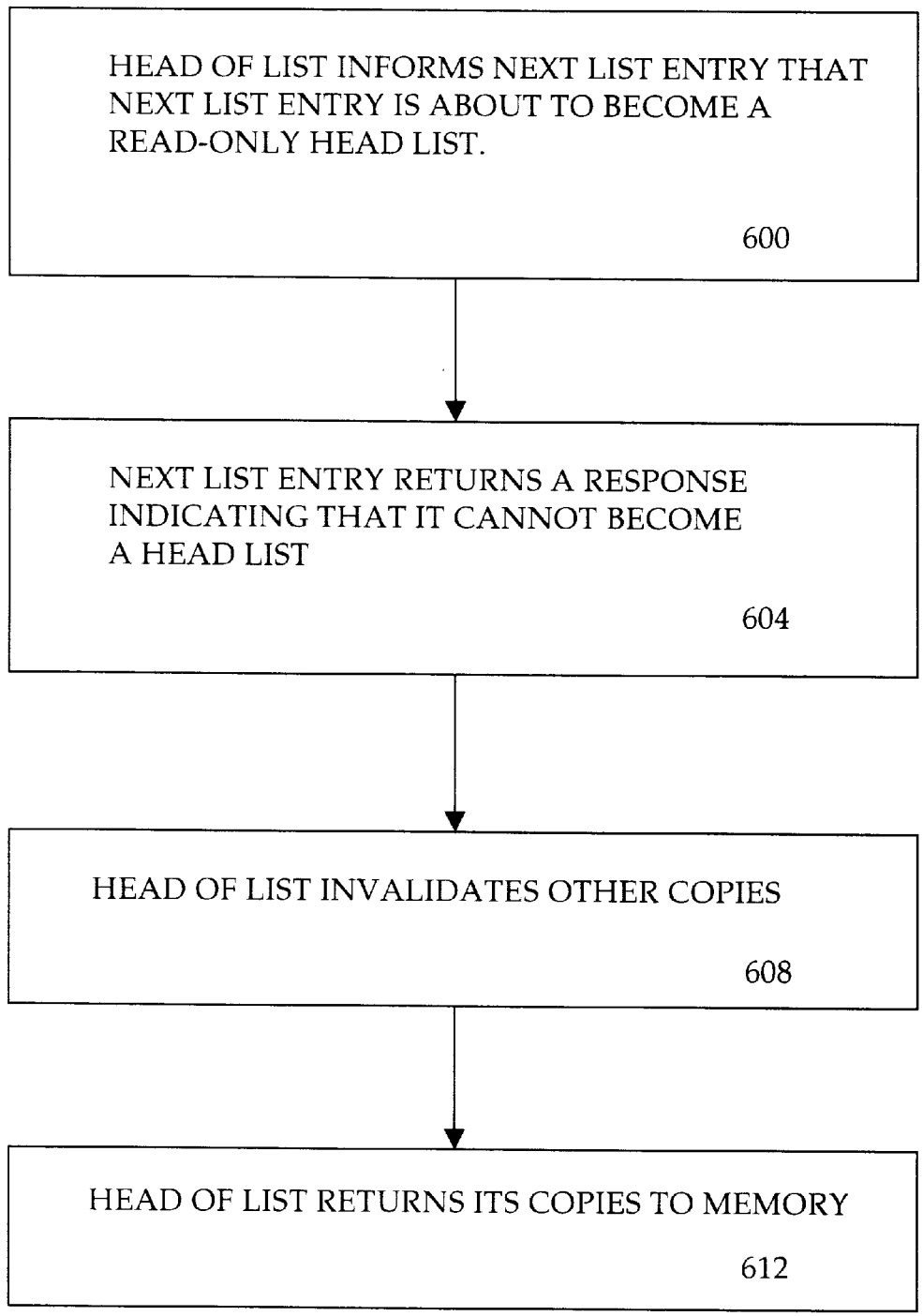
FIG. 6 is a flowchart illustrating a prior art attempt to solve the problem of not supporting a read-only-list head.
Figure 7A:
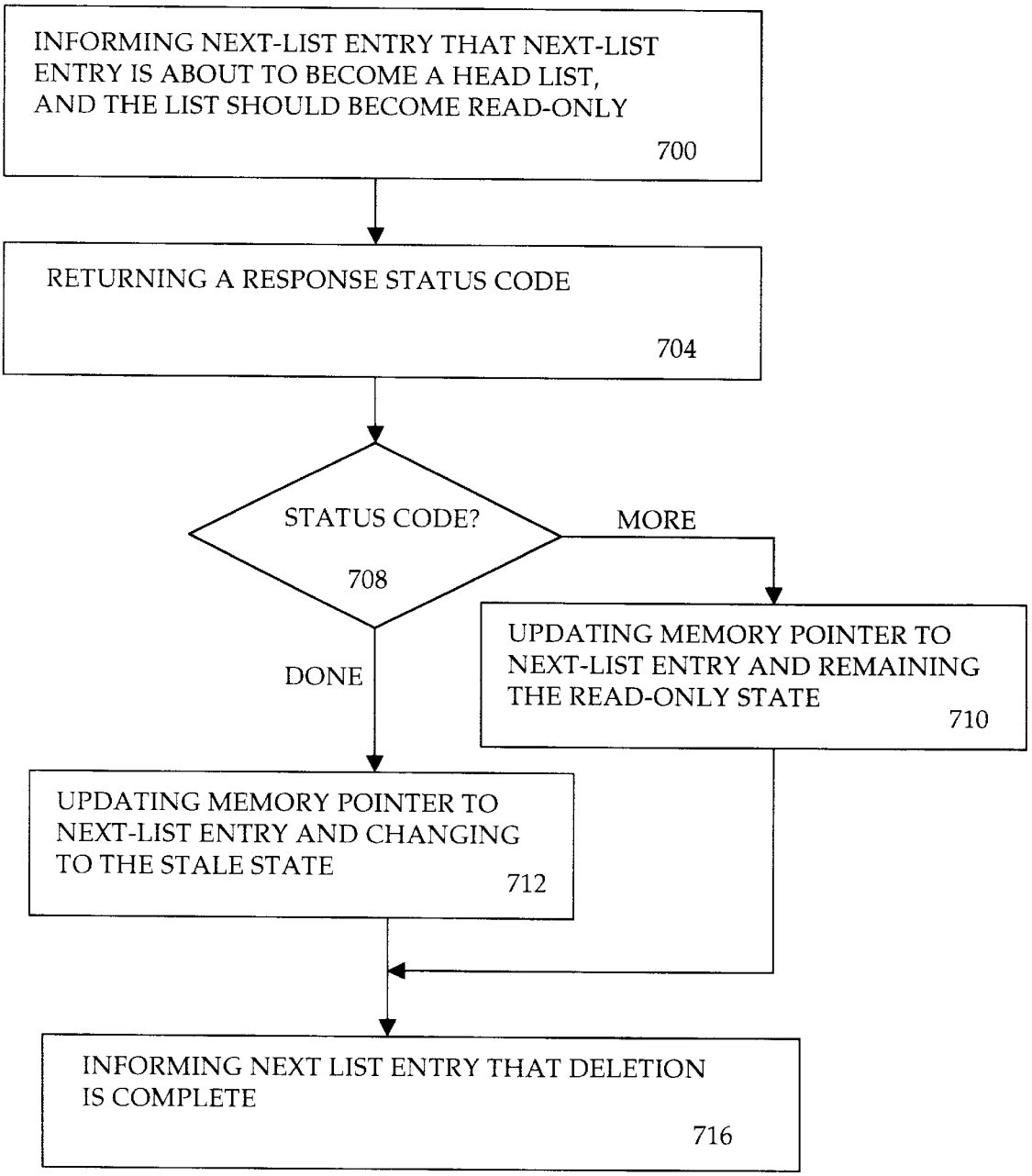
FIG. 7A shows the steps of deleting a head entry in accordance with the invention.

The invention deletes a read-only head entry as shown in the flowchart of FIG. 7A. In step 700 the head entry informs the next list entry that the next-list entry is about to become the head of the list and the list should become read-only.

In step 704 the next list entry returns a response status code which includes, for illustrative purposes, MORE for supporting and DONE for not supporting a read-only option.

In step 708 the system determines whether the return code from step 704 is DONE or MORE. If it is MORE, memory 104 in step 710 points to the next list entry, allowing the next list entry to become the new head of the list. If the return code is DONE, memory 104 in step 712 also points to the next list entry but the system changes memory line from the fresh state to the stale state.

In step 716 the system informs the next list entry, now the new head of the list, that deletion is complete.

Figure 7B:
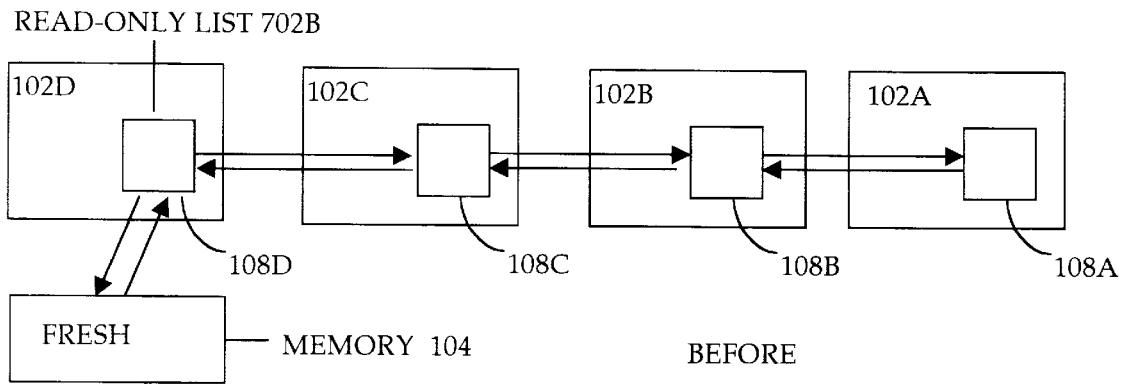
FIG. 7B shows the original list before and the two resulting lists after the head of the list has been deleted.
Figure 7B:
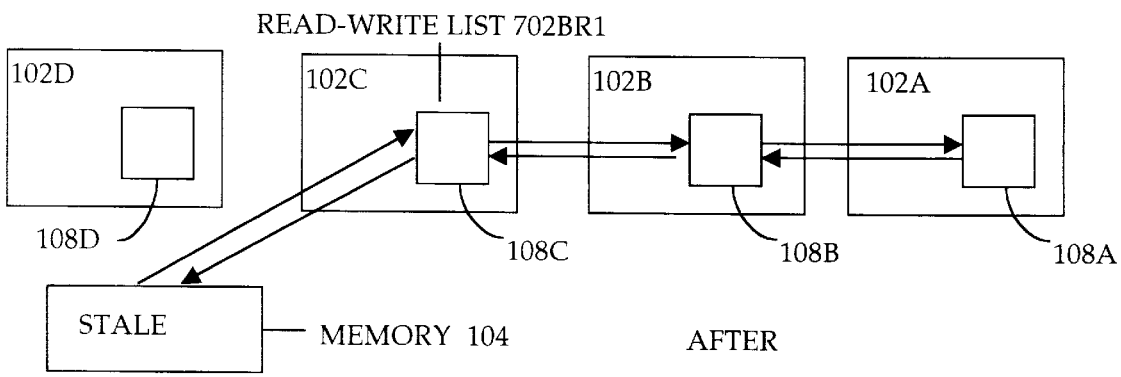
Figure 7B:
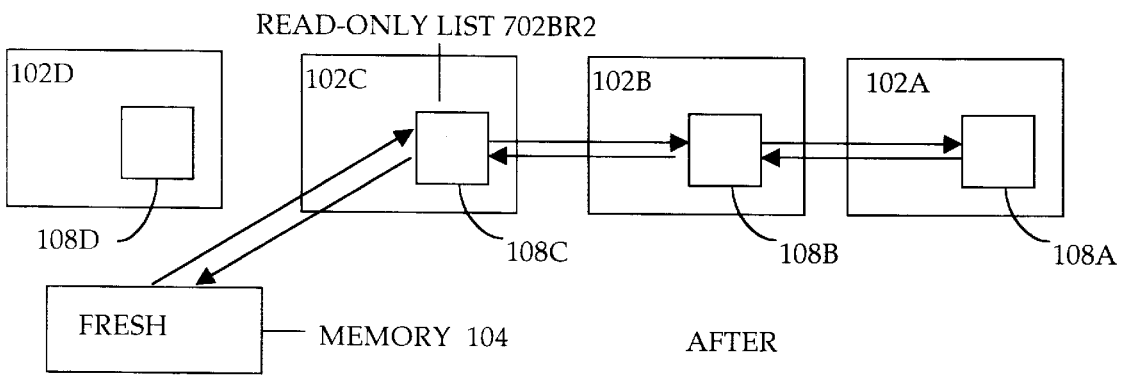

FIG. 7B shows the original list 702B and two resulting lists 702BR1 and 702BR2 after cache 108D, the head of the list, has been deleted in accordance with the invention. List 702B is read-only and memory 104 is in the FRESH state. Processor 102D supports a read-only list and processor 102C may support both a read-only and a read-write list. If processor 102C supports a read-write list, cache 108C, upon deletion of the head-of-list 108D, becomes the head of the list 702BR1 and the list becomes read-write. Memory 104 changes from the FRESH state to the STALE state. If processor 102C supports read-only list, memory 104 remains in the FRESH state and cache 108C becomes the head of a read-only list 702BR2.

Figure 8:
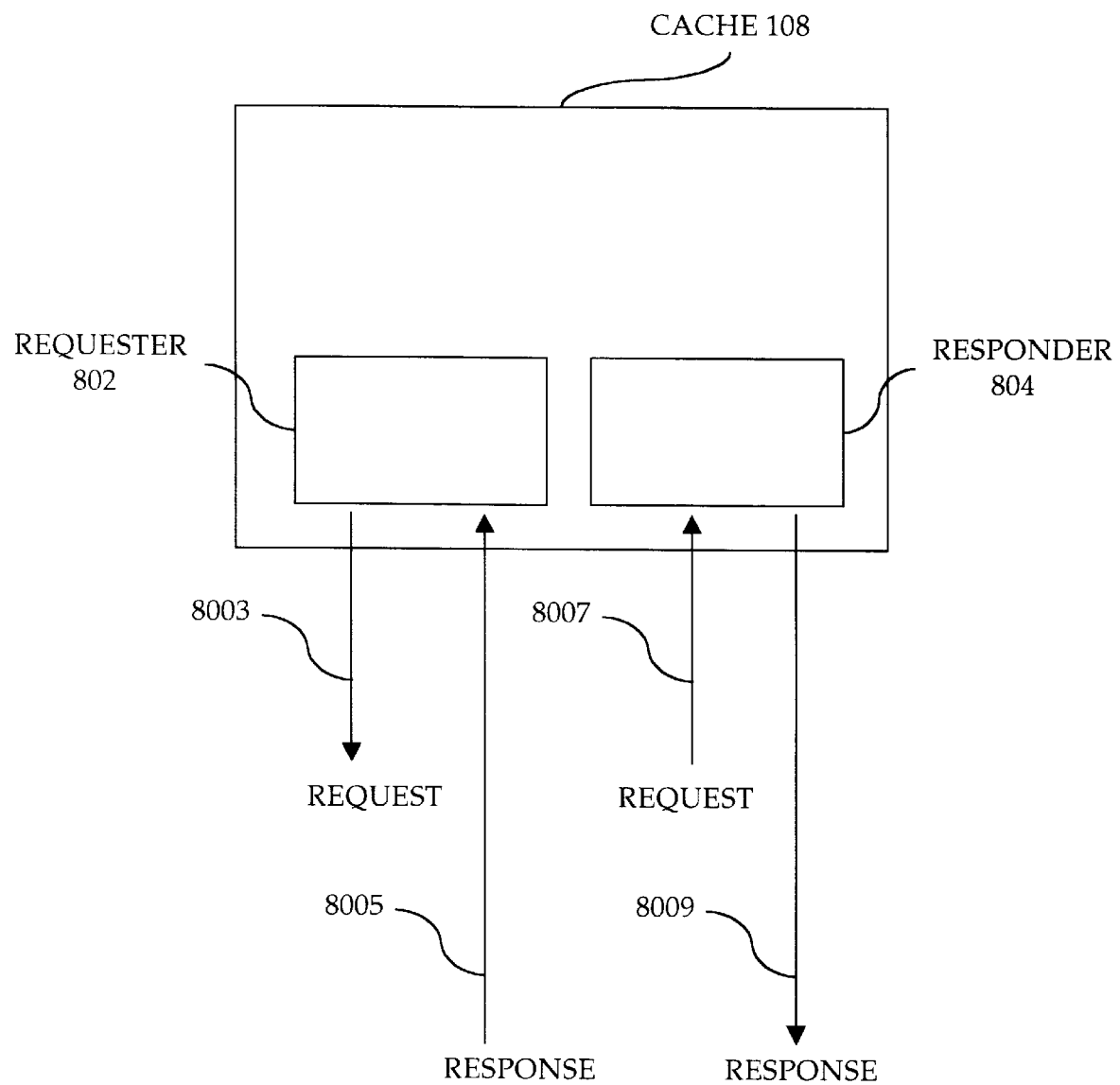
FIG. 8 shows a cache in accordance with the present invention.

FIG. 8 shows, in relevant parts, a cache 108 in accordance with the invention that includes a requester 802 and a responder 804. Requester 802, via a Request on line 8003, initiates an action desired by the processor 102 to another processor 102 or to memory 104, and receives a Response on line 8005. Responder 804 receives either from a processor 102 or memory 104 a Request on line 8007, and, via a Response on line 8009, responds to the action requested by a requester 802. In the preferred embodiment memory 104 includes a responder 804, but does not include a requester 802.

Figure 9A:
Figure 9B:

FIGS. 9A and 9B show the applicable portion of the state transition table of cache requester 802D having performed a delete sequence as illustrated in FIG. 7B. Row 2 specifies actions when in a state generated by a response to row 1, and row 3 specifies actions when in a state generated by a response to row 2.

In FIG. 9A row 1, because the list 702B was read-only with memory in the state "FRESH," the old state of cache 108D is "HEADf," that is, cache 108D is the head ("HEAD") of a read-only or fresh ("f") list. Cache 108D then sends a request "cMarkNextFresh" to cache 108C. "c" indicates a communication to a cache (cache 108C, rather than memory 104). "Mark" indicates no data is transferred, but a state update is requested. "Next" indicates cache 108C is the next entry after cache 108D, and "Fresh" indicates that the list should be read-only. Cache 108D then receives a response, either a "MORE" or a "DONE," from cache 108C. If a "MORE" is received (as in row 1) cache 108D's next state is "HEADf_PUSH," that is, cache 108D remains a read-only ("f") head ("HEAD"), but will be deleted by pushing ("PUSH") the data to the new entry in the list.

In row 2, cache 108D is in a state "HEADf_PUSH" and generates a request "mMarkForwardFresh" to memory ("m") 104. "Mark" indicates no data is transferred, "Forward" indicates a request to move the memory pointer forward (to cache 108C), and "FRESH" indicates a read-only list. After receiving the response "DONE" from memory 104 cache 108D changes to a new state "HEAD_POKE." Cache 108D will then inform cache 108C that cache 108C has become the new head of the list.

In row 3, cache 108D, having an old state "HEAD_POKE," generates a request "cMarkHeadPoke," which informs cache 108C that cache 108C is about to become a head, and cache 108D will go to the next stable state ("Poke"). After receiving the response "DONE" from cache 108C, cache 108D changes to a new state "INVALID." Cache 108D thus has been invalidated or deleted from the list.

In FIG. 9B, processor 102C does not support a read-only list. In row 1, cache 108D, after generating a request "cMarkNextFresh" to cache 108C, receives a response "DONE" and changes to a new state "HEADd_PUSH." Cache 108D will be deleted ("PUSH") so that cache 108C becomes the head ("HEAD") of a read-write ("d") list.

In row 2 cache 108D has an old state "HEADd_PUSH" and generates a request "mMarkFowardOwned." Cache 108D instructs memory ("m") 104 that memory 104 is about to point to the next entry in the list ("Forward" to cache 108C) and memory state should change to read-write ("Owned"). Cache 108D then receives a response "DONE" from memory 104 and has a new state "HEAD_POKE."

In row 3, because cache 108D has an old state "HEAD_POKE" like that of FIG. 9A row 3, all row 3 explanation is the same as that of FIG. 9A row 3.

FIG. 9C shows the applicable portion of the state transition table of cache requester 802D having performed a delete sequence if list 702B (FIG. 7B) were a read-write list. In row 1, cache 108D has an old state "HEADd" because cache 802D is the head ("HEAD") of a read-write ("d") list. Cache 108D then sends a request "cMarkNextOwned" to cache 108C, indicating a communication to a cache ("c"); no data is transferred ("Mark"); and the list should be read-write ("Owned"). Cache 108D then receives a response "DONE" from cache 108C, and changes state to "HEADd_PUSH," that is, cache 108D will be deleted ("PUSH") from the list so that cache 108C becomes the head ("HEAD") of a read-write ("d") list. Because FIG. 9C row 2 and row 3 include the same data as that of FIG. 9B row 2 and row 3, FIG. 9C row 2 and row 3 explanation is the same as that of FIG. 9B row 2 and row 3.

Figure 9D:
FIG. 9D shows details of a cache responder going through a delete sequence.

FIG. 9D shows details of cache responder 804C of cache 108C in FIG. 7B. In row 1, cache 108C was initially a middle entry and its old state was "COREd." "CORE" is for a non-head entry. Cache 108C then receives a request "cMarkNextFresh" from cache 108D, and cache 108C is about to become the head of a read-only list. Because processor 102C supports a read-only list, cache 108C then changes to the new state "HEADf_WAIT," i.e., cache 108C is waiting ("WAIT") to become a list head ("HEAD") of a read-only ("f") list. Cache 108C then returns a response "MORE" to cache 108D, which indicates additional interactions between cache 108C, cache 108D, and memory 104 will occur before cache 108C becomes the head of the list.

In row 2, cache 108C, having an old state "HEADf_WAIT," receives a request "cMarkHeadPoke" from cache 108D. "Poke" indicates that cache 108D will go into a stable state. Cache 108C then becomes the head of a fresh list ("HEADf"), and thus returns a response "DONE" to cache 108D.

In row 3 cache 108D informs cache 108C that cache 108C is about to become the head of a read-write list ("cMarkNextOnwed"). Therefore, cache 108C changes to a new state "HEADd_WAIT," waiting ("WAIT") to become the head ("HEAD") of a read-write ("d") list. Cache 108C then returns a response "DONE" to cache 108D.

In row 4 cache 108C has an old state "HEADd_WAIT," receives a request "cMarkHeadPoke" from cache 108D, and then becomes the head ("HEAD") of a read-write list ("d"). Finally, cache 108C returns a response "DONE" to cache 108D.

FIG. 9E shows details of cache responder 804C of cache 108C when processor 102C does not support read-only option. In row 1, cache 108C receives a request from cache 108D that cache 108C is about to become the head of a read-only list ("cMarkNextFresh"). Because processor 102C does not support read-only option, cache 108C will become the head of a read-write list (read-write option is presumably supported). Cache 102C then changes to a new state "HEADd_WAIT," and returns a response "DONE" to cache 108D.

In row 2, cache 108C receives a request "cMarkNextOwned" from cache 108D that requests cache 108C to become the head of a read-write list. Because read-write option is presumably supported, cache 108C waits to become the head of a read-write list ("HEADd_WAIT"), and then returns a response "DONE" to cache 108D.

In row 3, cache 108C is waiting to become the head of a read-write list ("HEADd_WAIT") and then receives a request "cMarkHeadPoke" from cache 108D. Cache 108C then becomes the head of a read-write list ("HEADd"), and returns a response "DONE" to cache 108D.

FIG. 9F shows the state table of memory 104. In both rows 1 and 2, the list was read-only (having an old state "FRESH"), and memory 104 was pointing to cache entry 108D (old Id) as being the head of the list. After the transaction is completed ("DONE"), memory 104 points to cache 108C (new Id). However, in row 1, memory 104 receives a request "mMarkForwardFresh," i.e., to change the pointer from the old head to the new head of the list (108D to 108C), and remains read only ("Fresh"). In contrast, memory 104 in row 2 receives a request "mMarkForwardOwned." Memory 104 then points forward to cache 108C so that cache 108C becomes the head of a read-write ("Owned") list. Memory 104 therefore changes to the new state "STALE."

The invention has been explained with reference to a preferred embodiment. Other embodiments will be apparent to those skilled in the art after reading this disclosure. For example, the present invention may be implemented in either software or hardware and any implementation of lists can utilize the invention. Additionally, the present invention may effectively be used in combination with multi-processor systems other than that described in accordance with the preferred embodiment. Therefore, these and other variations upon the preferred embodiment are intended to be covered by the following claims.

What is claimed is:

1. In a multi-processor computer system, a mixed-coherence-protocol method for deleting a head entry from a read-only list, comprising the steps of:

indicating that a next-list entry is about to become the head of a read-only list;

changing a state of a memory line if said next-list entry supports a read-write state, said memory line remaining in the same state if said next-list entry supports a read-only state;

updating a memory's forward pointer to said next-list entry; and indicating the completion of a deletion.

2. In a multi-processor computer system, a computer-readable medium embodying instructions for causing a device to delete a head entry from a read-only list, comprising the steps of:

indicating that a next-list entry is about to become the head of a read-only list;

deleting said head entry wherein the step of deleting includes the steps of changing a state of a memory line if said next-list entry supports a read-write state, said memory line remaining in the same state if said next-list entry supports a read-only state, and updating a memory's forward pointer to said next-list entry; and indicating the completion of said deletion.

3. In a multi-processor computer system, an apparatus for deleting a head entry from a read-only list, comprising:

means for indicating that a next-list entry is about to become the head of a read-only list;

means for deleting said head entry wherein said means for deleting includes means for determining, based on a returned response associated with said next-list entry, whether the system associated with said next-list entry supports a read-only or a read-write state, means for changing a state of a memory line if said next-list entry supports a read-write state, means for allowing said memory line to remain in the same state if said next-list entry supports a read-only state, and means for updating a memory's forward pointer to said next-list entry; and means for indicating the completion of said deletion.

* * * * *